(12) United States Patent
Maschmeyer et al.

(10) Patent No.: US 12,346,948 B2
(45) Date of Patent: Jul. 1, 2025

(54) SYSTEMS AND METHODS FOR MODELING REAL-WORLD OBJECTS IN VIRTUAL SCENES

(71) Applicant: Shopify Inc., Ottawa (CA)

(72) Inventors: Russ Maschmeyer, Berkeley, CA (US); Eric Andrew Florenzano, San Francisco, CA (US); Brennan Letkeman, Calgary (CA); Diego Macario Bello, Montreal (CA); Daniel Beauchamp, Toronto (CA)

(73) Assignee: Shopify Inc., Ottawa (CA)

( * ) Notice: Subject to any disclaimer, the term of this patent is extended or adjusted under 35 U.S.C. 154(b) by 294 days.

(21) Appl. No.: 17/950,225

(22) Filed: Sep. 22, 2022

(65) Prior Publication Data

US 2024/0046329 A1  Feb. 8, 2024

Related U.S. Application Data

(60) Provisional application No. 63/395,367, filed on Aug. 5, 2022.

(51) Int. Cl.
*G06T 19/00* (2011.01)
*G06Q 30/0601* (2023.01)

(52) U.S. Cl.
CPC ..... *G06Q 30/0627* (2013.01); *G06Q 30/0643* (2013.01); *G06T 19/006* (2013.01)

(58) Field of Classification Search
CPC ...... G06T 19/006; G06T 7/00; G09G 2340/12
See application file for complete search history.

(56) References Cited

U.S. PATENT DOCUMENTS

| | | | |
|---|---|---|---|
| 10,943,395 B1 * | 3/2021 | Green | G06F 3/0346 |
| 2017/0228139 A1 * | 8/2017 | Goslin | G06F 3/017 |
| 2018/0173404 A1 * | 6/2018 | Smith | G06F 3/017 |
| 2018/0350118 A1 * | 12/2018 | Bastaldo-Tsampalis | G06T 19/006 |
| 2021/0248669 A1 | 8/2021 | Wade et al. | |

* cited by examiner

*Primary Examiner* — Antonio A Caschera
(74) *Attorney, Agent, or Firm* — Rowand LLP

(57) ABSTRACT

A computer-implemented method includes: obtaining a three-dimensional (3D) representation of a first real-world environment; identifying a real-world object of interest in a second real-world environment, the first real-world environment different from the second real-world environment; determining a first position in the 3D representation of the first real-world environment corresponding to the real-world object of interest; and generating an augmented reality (AR) version of the first real-world environment for presentation in the second real-world environment using the 3D representation of the first real-world environment and based on positioning the real-world object of interest in the first position in the AR version of the first real-world environment.

20 Claims, 11 Drawing Sheets

FIG. 11

SYSTEMS AND METHODS FOR MODELING REAL-WORLD OBJECTS IN VIRTUAL SCENES

CROSS-REFERENCE TO RELATED APPLICATION

The present application claims the benefit of priority to U.S. Provisional Patent Application No. 63/395,367 filed on Aug. 5, 2022, the contents of which are incorporated herein by reference.

TECHNICAL FIELD

The present disclosure relates to three-dimensional modeling and, in particular, to systems and methods for generating 3D augmented reality scenes.

BACKGROUND

Augmented reality (AR) is used to enhance a real-world environment with computer-generated information. In AR, virtual information is overlaid on a view of a real-world space. For example, using an AR-enabled device, a user can view a real-world scene and load virtual representations of objects to be rendered in the scene. The virtual objects can be framed at desired locations within the scene, allowing the user to view the objects in the context of their real-world surroundings.

BRIEF DESCRIPTION OF THE DRAWINGS

Embodiments will be described, by way of example only, with reference to the accompanying figures wherein:

FIG. 11 is an example of a home page of an administrator, in accordance with an example embodiment.

Like reference numerals are used in the drawings to denote like elements and features.

DETAILED DESCRIPTION OF EMBODIMENTS

Figure 1:
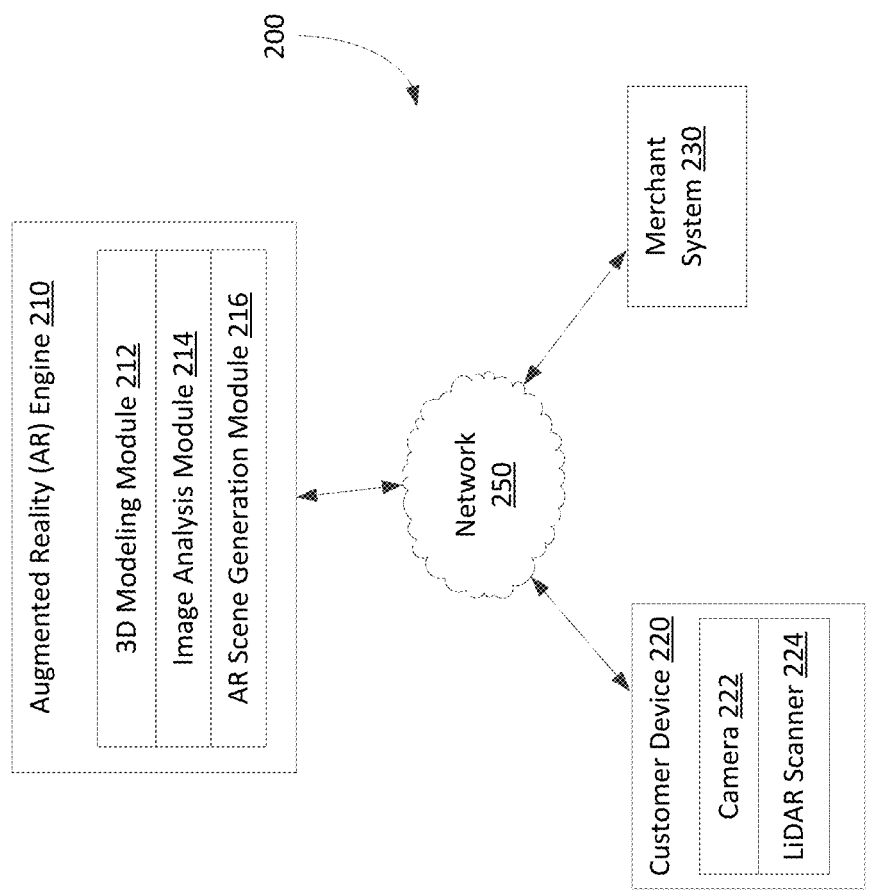
FIG. 1 illustrates an example networked computing environment for generating AR content.

In an aspect, the present application discloses a computer-implemented method. The method includes: obtaining a three-dimensional (3D) representation of a first real-world environment; identifying a real-world object of interest in a second real-world environment, the first real-world environment different from the second real-world environment; determining a first position in the 3D representation of the first real-world environment corresponding to the real-world object of interest; and generating an augmented reality (AR) version of the first real-world environment for presentation in the second real-world environment using the 3D representation of the first real-world environment and based on positioning the real-world object of interest in the first position in the AR version of the first real-world environment.

In some implementations, determining the first position in the 3D representation of first real-world environment may include determining a position of a similar real-world object in the first real-world environment and generating the AR version of the first real-world environment may include positioning the real-world object of interest at the position of the similar real-world object in the AR version of the first real-world environment so as to replace the similar real-world object.

In some implementations, generating the AR version of the first real-world environment may include removing the similar real-world object from the 3D representation of the first real-world environment.

In some implementations, determining the first position in the 3D representation of the first real-world environment may include identifying an empty space in the 3D representation of the first real-world environment sized to fit the real-world object of interest and generating the AR version of the first real-world environment may include positioning the real-world object of interest within the empty space in the AR version of the first real-world environment.

In some implementations, identifying the empty space in the 3D representation of the first real-world environment may include determining positions of one or more objects in the 3D representation of the first real-world environment.

In some implementations, identifying the empty space in the 3D representation of the first real-world environment may include determining a position of a second object in the 3D representation of the first real-world environment, the second object satisfying a defined condition with respect to the real-world object of interest.

In some implementations, the 3D representation of the first real-world environment may include metadata indicating at least one of location or boundary associated with at least one object in the 3D representation.

In some implementations, the method may further include obtaining a first image of the real-world object of interest and generating the AR version of the first real-world environment may include combining the first image and the 3D representation of the first real-world environment.

In some implementations, the AR version of the first real-world environment may be generated responsive to determining that a defined trigger condition is satisfied.

In some implementations, the defined trigger condition may relate to at least one of: a detected pose of a user relative to the real-world object of interest; input of the user received via an input interface; a distance of the user relative to the real-world object of interest; or detected contact between the user and the real-world object of interest.

In some implementations, obtaining the 3D representation of the first real-world environment may include obtaining 3D scan data including at least one of camera data or LiDAR sensor data.

In some implementations, generating the AR version of the first real-world environment may include identifying a first subregion of a first image containing the real-world object of interest and a second subregion of the first image that does not contain the real-world object of interest.

In some implementations, generating the AR version of the first real-world environment may include combining the 3D representation of the first real-world environment with the first image such that the second subregion of the first image is hidden in the AR version of the first real-world environment.

In some implementations, the method may further include: obtaining depth data associated with the second real-world environment; and partitioning an image of the second real-world environment using the depth data to obtain an image segment containing the real-world object, and generating the AR version of the first real-world environment may include combining the image segment with the 3D representation of the first real-world environment.

In some implementations, the depth data may include a depth map of the second real-world environment generated using a 3D scanner.

In some implementations, the method may further include: obtaining rotation and position data associated with the 3D scanner capturing the depth map; and matching pixels of the depth map to locations in the image of the second real-world environment based on the rotation and position data.

In some implementations, the method may further include determining a bounding box representing a spatial extent of the real-world object in the second real-world environment, and the bounding box may be determined based on the depth data.

In another aspect, the present application discloses a computing system. The computing system includes a processor and a memory storing computer-executable instructions that, when executed, are to cause the processor to: obtain a three-dimensional (3D) representation of a first real-world environment; identify a real-world object of interest in a second real-world environment, the first real-world environment different from the second real-world environment; determine a first position in the 3D representation of the first real-world environment corresponding to the real-world object of interest; and generate an augmented reality (AR) version of the first real-world environment for presentation in the second real-world environment using the 3D representation of the first real-world environment and based on positioning the real-world object of interest in the first position in the AR version of the first real-world environment.

In another aspect, the present application discloses a non-transitory, computer-readable medium storing computer-executable instructions that, when executed by a processor, configure the processor to carry out at least some of the operations of a method described herein.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "product data" refers generally to data associated with products that are offered for sale on an e-commerce platform. The product data for a product may include, without limitation, product specification, product category, manufacturer information, pricing details, stock availability, inventory location(s), expected delivery time, shipping rates, and tax and tariff information. While some product data may include static information (e.g., manufacturer name, product dimensions, etc.), other product data may be modified by a merchant on the e-commerce platform. For example, the offer price of a product may be varied by the merchant at any time. In particular, the merchant may set the product's offer price to a specific value and update said offer price as desired. Once an order is placed for the product at a certain price by a customer, the merchant commits to pricing; that is, the product price may not be changed for the placed order. Product data that a merchant may control (e.g., change, update, etc.) will be referred to as variable product data. More specifically, variable product data refers to product data that may be changed automatically or at the discretion of the merchant offering the product.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extended by connecting one or more additional sales channels representing platforms where products can be sold. In particular, the sales channels may themselves be e-commerce platforms, such as Facebook Shops™, Amazon™, etc.

Techniques for Generating AR Scenes Depicting Real-World Objects

Augmented reality technologies are employed to support combined modeling of real and virtual information. An AR scene comprises a view of a real-world environment that is augmented with computer-generated information. AR-enabled computing devices, such as smartphones and head-mounted displays (HMDs), can be used to view and interact with AR scenes. Virtual models of physical objects can be visualized in a view of a real-world space using AR-enabled devices. AR can support a dynamic and interactive shopping experience. Customers can, for example, view virtual representations of products within an AR version of their surrounding environment, such as their own living room, so that the appearance of the products in the environment can be appreciated.

In some cases, a user may come across a physical object in their surrounding environment that they wish to view in a different setting. For example, a customer standing in a brick-and-mortar furniture store may see a product (e.g., a sofa) that they like, and wish to preview the appearance and arrangement of the product in their living room. The customer may also want to be able to physically interact with the product—for example, by sitting on it, touching it, etc.—whilst simultaneously viewing how the product would look in their living room. The traditional AR paradigm of augmenting a view of a real-world environment by overlaying virtual information does not support either of these user experiences.

The present application discloses a system and methods for generating AR scenes that depict real-world physical objects in virtual settings. Specifically, the disclosed system is configured to generate a 3D AR scene based on (1) processing 3D representation of a first real-world environment (e.g., an interior space, such as a room) and objects therein, and (2) using the 3D representation, generating an AR version of the first real-world environment that depicts a physical object of interest from a second real-world environment different from the first real-world environment. The 3D representation of the first real-world environment may, in at least some implementations, comprise 3D scan data. For example, 3D scan data may be generated using one or more optical sensors (e.g., cameras, LiDAR sensors, etc.). A 3D floor plan of the first real-world environment may be created based on the 3D representation. The AR version of the first real-world environment may be generated responsive to certain defined activation cues in connection with the user and/or the physical object of interest. The relative location of the physical object in the AR version of the first real-world environment may be determined based on one or more defined rules relating to the physical object and/or the first real-world environment.

The system first obtains a 3D representation of a first real-world environment. The 3D representation may, for example, comprise 3D scan data that is obtained using a camera and/or a LiDAR scanner. The captured camera/LiDAR sensor data is used to build a 3D model of the first real-world environment. In at least some implementations, the system may leverage a third-party application or service for floor plan designs to generate the 3D model. Example applications include magicplan (https://www.magicplan.app/) and Apple's RoomPlan. RoomPlan is an API powered by the ARKit framework that uses camera/LiDAR scanner data to create 3D floor plans and capture key elements of a real-world room such as dimensions, furniture, etc. RoomPlan API outputs a geometric model of a scanned room, but may not provide texture data, i.e., only contour information (and not surface texture data) for the room may be represented in an untextured model. The untextured model is aligned with the real-world room (for example, using ARWorldMap). In particular, detected features of the untextured model can be matched with features of the room for alignment, which then allows for correct texturing of objects. RoomPlan API is described in greater detail in "RoomPlan|Apple Developer Documentation", which is incorporated herein by reference in its entirety and can be accessed at https://developer.apple.com/documentation/RoomPlan.

The system is configured to detect physical objects in the real-world environment. It may do this using the 3D representation of the real-world environment. In some implementations, a third-party application such as RoomPlan may process 3D scan data to detect various objects (e.g., couches, desks, ovens, door frames, window frames, etc.) and environment defining features. Additionally, the system and/or third-party application may determine three-dimensional "bounding boxes" encompassing positions of the detected objects, and bounding box references (e.g., geometric coordinates of boundaries of the boxes) may be provided. The 3D scan data, object and feature detection data, and bounding box reference data may be saved in memory in association with a descriptor of the first real-world environment.

A physical object of interest is identified in a second real-world environment that is different from the first real-world environment. In particular, the physical object of interest is selected/detected in a physical space that is different from the environment represented by the 3D representation. The physical object of interest is an object that will be viewable at a particular position in the AR version of the first real-world environment. The position of the physical object in the AR version of the first real-world environment is determined by the system in accordance with one or more defined rules (described in more detail below). In some implementations, multiple physical objects of interest may be identified in the second real-world environment.

Responsive to detecting one or more defined triggers, the system generates an AR version of the first real-world environment (e.g., a user's living room) that includes the physical object of interest. The triggers may include, but are not limited to:

Pose detection: the system may detect that a pose of the user satisfies a defined condition. In particular, the user's pose may be determined to satisfy a certain condition with respect to the physical object. For example, the user may be determined to be seated or in motion to sit on a couch, based on a detected change in height associated with the user's AR device.

User input: the system may receive user input (for example, via an AR device or other input interface) for framing the physical object in a display of the AR device and selecting a prompt to preview the first real-world environment.

Proximity: the system may be configured to detect that the user satisfies a proximity-based condition with respect to the physical object (e.g., standing within a predetermined distance from the object).

Contact: the system may detect that intentional contact by the user with the physical object.

The AR version of the first real-world environment is generated through a compositing process. In some implementations, the physical object of interest may be segmented from a scene of the second real-world environment, for example, by processing a live 3D image of the second real-world environment to recognize the physical object of interest and partitioning the image into subregions, i.e., a subregion containing the physical object of interest and a subregion not containing the physical object of interest. Edge detection techniques may be employed in the object recognition stage. In some implementations, the system may train a machine learning model for purposes of object segmentation, or rely on a trained model associated with the physical object of interest that is provided by third-parties (e.g., product manufacturer). In some implementations, the system may also perform feathering on the results of edge detection to, for example, soften jagged edges.

In some implementations, the system may obtain depth data associated with the second real-world environment and use the depth data as part of the object segmentation. The system may capture depth data using optical sensors (e.g., a 3D scanner such as a LiDAR camera) or otherwise determine it (e.g., by interpolating it from data comprising stereo images from cameras). For example, a depth map of the second real-world environment may be generated by capturing the scene using a LiDAR camera. The depth map for the scene informs the isolating of a physical object of interest from the surrounding environment. For example, the system may be configured to draw a bounding box around a specific object of interest, and to then use the subset of depth data corresponding to that bounding box to determine which pixels to keep (i.e., to represent the segmented object). In some implementations, determining the subset of depth data that corresponds to the bounding box may include the step of mapping the depth data into a coordinate system of a real-world environment (or a representation thereof). For example, depth data for a physical object may be combined with position and rotation data from the camera to determine where a certain pixel in the depth map lies in real-world space. A value for the pixel can then be determined in real-world space. Advantageously, the use of depth maps may avoid or reduce reliance on meshing or machine learning-based techniques for object segmentation—such techniques are generally CPU intensive and require training image recognition ML models. The depth data may be supplemented by geometric awareness of the scene (e.g., location of floor, ceiling, and walls) during object segmentation. In some implementations, the system may truncate the bounding box to improve the object segmentation results. For example, where the bounding box comprises flat faces and the object of interest is situated on top of an uneven real-world surface (e.g., a shag carpet), the system may raise the bottom face of the bounding box slightly to entirely or substantially exclude the uneven surface from the bounding box.

The subregion of the image that does not contain the physical object may be "masked". Specifically, the 3D representation of the first real-world environment may be combined with the live 3D image of the second real-world environment such that the resulting AR version of the first real-world environment effectively hides the subregion not containing the physical object of interest. In this way, only the physical object of interest (and associated subregion) from the image of the second real-world environment is displayed for view in a composite scene, i.e., AR version of the first real-world environment. The composite scene may be editable, i.e., additional virtual elements (e.g., virtual objects such as exercise equipment) may be introduced to the AR scene.

The AR version of the first real-world environment may be generated using a rules engine. The system is configured to process the 3D representation of the first real-world environment to determine a position (i.e., a location and an orientation) corresponding to the physical object of interest in the first real-world environment. The system may then combine the 3D representation of the first real-world environment with the live image of the second real-world environment such that the physical object of interest is situated in the position determined by the system. In at least some implementations, the 3D representation of the first real-world environment may be modified based on user input. For example, a user may manipulate a 3D model of the first real-world environment to cause a 3D scene of the first real-world environment to undergo changes (e.g., rotating, translating, panning, zooming, etc.) relative to the physical object of interest.

The determination of suitable location and/or orientation for the physical object of interest in the AR version of the first real-world environment may rely on rule-based heuristics associated with the first real-world environment. For example, a first object (e.g., a couch) may be required to be positioned in close proximity and/or in a fixed orientation relative to a second object (e.g., a television). As another example, a first object may be required to be positioned in the same location and orientation as (i.e., replace) a similar object in the 3D representation of the first real-world environment. As yet another example, if no "placeholder" is defined for the real-world object in the first real-world environment, the system may default to generating the AR version of the first real-world environment so that the physical object is positioned in a portion of the 3D representation of the first real-world environment that results in little or no collision with other virtual objects in the 3D representation, or any other suitable location in the 3D representation of the first real-world environment.

In some implementations, the system may be configured to recognize location and/or object type of specific objects based on the 3D scan data and allow for altering the arrangement of one or more objects in the AR version of the first real-world environment to accommodate positioning of the physical object of interest. For example, if a real-world couch is determined to not fit in a room based on a current arrangement of virtual objects for the room, the user may be presented with one or more alternative arrangements of the virtual objects that can accommodate positioning the real-world couch in the room Reference is first made to FIG. 1, which illustrates, in block diagram form, an example networked computing environment 200 for generating AR content. As shown in FIG. 1, the networked computing environment 200 may include an AR engine 210, customer devices 220, merchant systems 230, and a network 250 connecting the components of networked computing environment 200.

The customer devices 220 and the merchant systems 230 communicate via the network 250. In at least some implementations, each of the customer devices 220 and the merchant systems 230 may be a computing device. The customer devices 220 and the merchant systems 230 may take a variety of forms including, for example, a mobile communication device such as a smartphone, a tablet computer, a wearable computer (such as an HMD or smartwatch), a laptop or desktop computer, or a computing device of another type.

The customer device 220 is a computing device associated with a customer. For example, a customer device 220 may be associated with an individual customer of an e-commerce platform. Customer devices 220 can be used to, for example, access product information, order products, manage customer accounts, and otherwise facilitate commercial activities of customers. As shown in FIG. 1, a customer device 220 includes certain sensors, such as a camera 222 and a LiDAR scanner 224, that can be used to collect sensor data. The sensors of customer device 220 may be used to capture data for use in generating AR scenes of spaces associated with the customer and/or customer device 220. For example, customers can capture live image or video data depicting their surrounding space using their customer device 220, and the captured image/video data may be overlaid with computer-generated information to generate an AR scene of the space. Using their customer device 220, a customer can view, edit, manipulate, and otherwise interact with AR scenes featuring objects of interest.

A merchant system 230 is a computing system associated with a merchant. Using their merchant system 230, a merchant can provide product information, manage online storefronts, and access various merchant-facing functionalities of an e-commerce platform.

An AR engine 210 is provided in the networked computing environment 200. The AR engine 210 contains processor-executable instructions that, when executed by one or more processors, cause a computing system to carry out some of the processes and functions described herein. In some implementations, the AR engine 210 may be provided by an e-commerce platform, either as a core function of the e-commerce platform or as an application or service supported by or communicating with the e-commerce platform. In other implementations, the AR engine 210 may be implemented, at least in part, by a user device, such as a customer device or a merchant device, or as a stand-alone service for generating AR content.

The AR engine 210 supports generation of AR content, such as AR scenes of virtual environments depicting real-world objects. The AR content may be used by an e-commerce platform, customer devices 220, and/or merchant systems 230. The AR engine 210 is communicably connected to one or more customer devices 220. Sensor data from customer devices 220 may be used in generating AR scenes. For example, customer devices 220 may transmit captured camera and LiDAR scanner data directly to the AR engine 210, or camera/LiDAR scanner data from customer devices 220 may be received at the AR engine 210 via an intermediary computing system. The AR engine 210 is configured to process the captured sensor data from customer devices 220 and generate AR scenes based on the sensor data.

As shown in FIG. 1, the AR engine 210 may include a 3D modeling module 212, an image analysis module 214, and an AR scene generation module 216. The modules may comprise software components that are stored in a memory and executed by one or more processors to support various functions of the AR engine 210.

The 3D modeling module 212 can be configured to perform operations for constructing, editing, storing, and manipulating 3D models of subjects. A 3D model is a mathematical representation of a subject, such as a person, a physical item, or a real-world space. The 3D modeling module 212 may obtain subject information (e.g., image and video data, range/depth data, etc.) and generate a virtual 3D representation of the subject based on the obtained information. The 3D models may be generated using various techniques such as photogrammetry, digital 3D sculpting, polygon modeling, and the like.

The image analysis module 214 can be configured to analyze images stored and/or received by the AR engine 210. The image analysis module 214 may receive image data (e.g., images, videos, live media feeds, etc.) as input, and output various information regarding the images. Any of a number of different algorithms may be included in or implemented by the image analysis module 214. Non-limiting examples of such algorithms include: object recognition algorithms, image segmentation algorithms; surface, corner, and/or edge detection algorithms; and motion detection algorithms. The image analysis module 214 can process images to detect objects and to identify features of the detected objects in the images. Examples of such object features include corners, surfaces, edges, and/or dimensions of objects.

The AR scene generation module 216 can be configured to generate AR scenes by combining real and virtual (i.e., computer-generated) information. Inputs to the AR scene generation module 216 may include, among others: images and/or videos (e.g., live video) of a real-world object; selection of a virtual space to depict in an AR scene; virtual scene data; and object data, such as orientation, location, dimensions, object features, and the like. For example, the AR scene generation module 216 may obtain a 3D model of a virtual space (e.g., a living room, hallway, etc.) and overlay the 3D model onto a representation, such as a live video, of a real-world object using AR. The AR scene generation module 216 may determine how to align the 3D model with the representation of the real-world object. AR scenes containing the aligned model can be provided by the AR scene generation module 216, for example, via AR-enabled computing devices (e.g., HMDs) for viewing thereon.

The AR engine 210, the customer devices 220, and the merchant systems 230 may be in geographically disparate locations. Put differently, the customer devices 220 may be remote from one or more of: AR engine 210, and the merchant systems 230. As described above, the customer devices 220, the merchant systems 230, and the AR engine 210 may be computing systems.

The network 250 is a computer network. In some implementations, the network 250 may be an internetwork such as may be formed of one or more interconnected computer networks. For example, the network 250 may be or may include an Ethernet network, an asynchronous transfer mode (ATM) network, a wireless network, or the like.

In some example embodiments, the AR engine 210 may be integrated as a component of an e-commerce platform. That is, an e-commerce platform may be configured to implement example embodiments of the AR engine 210. More particularly, the subject matter of the present application, including example methods for constructing 3D models and generating AR scenes disclosed herein, may be employed in the specific context of e-commerce.

Figure 2:
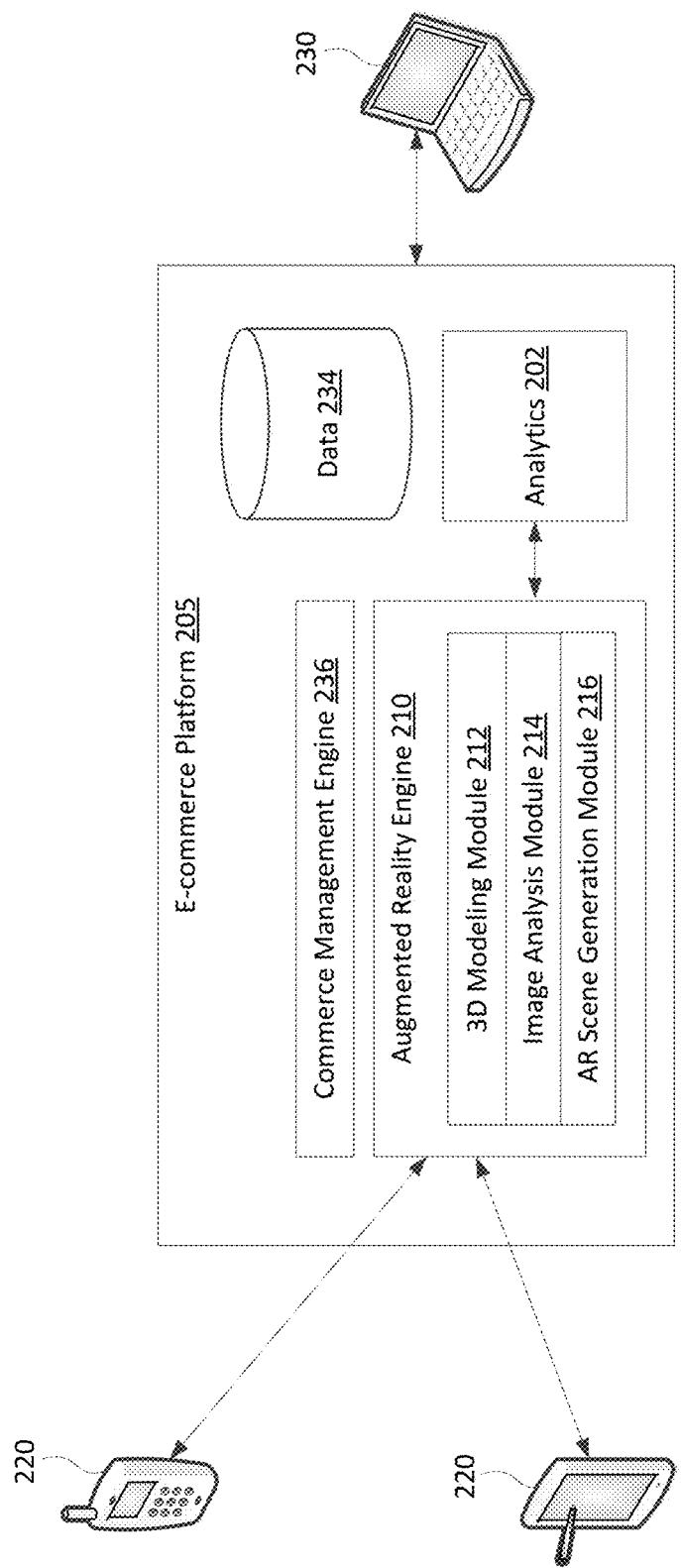
FIG. 2 is a block diagram of an e-commerce platform that is configured for implementing example embodiments of the AR engine illustrated in FIG. 1.

Reference is made to FIG. 2 which illustrates an example embodiment of an e-commerce platform 205 that implements an AR engine 210. The customer devices 220 and the merchant systems 230 may be communicably connected to the e-commerce platform 205. In at least some implementations, the customer devices 220 and the merchant systems 230 may be associated with accounts of the e-commerce platform 205. Specifically, the customer devices 220 and the merchant systems 230 may be associated with individuals that have accounts in connection with the e-commerce platform 205. For example, one or more customer devices 220 and merchant systems 230 may be associated with customers (e.g., customers having e-commerce accounts) or merchants having one or more online stores in the e-commerce platform 205. The e-commerce platform 205 may store indications of associations between customer devices/merchant systems and customers or merchants of the e-commerce platform, for example, in the data facility 134.

The e-commerce platform 205 includes a commerce management engine 236, an AR engine 210, a data facility 234, and a data store 202 for analytics. The commerce management engine 236 may be configured to handle various operations in connection with e-commerce accounts that are associated with the e-commerce platform 205. For example, the commerce management engine 236 may be configured to retrieve e-commerce account information for various entities (e.g., merchants, customers, etc.) and historical account data, such as transaction events data, browsing history data, and the like, for selected e-commerce accounts.

The functionality described herein may be used in commerce to provide improved customer or buyer experiences. The e-commerce platform 205 may implement the functionality for any of a variety of different applications, examples of which are described herein. Although the AR engine 210 of FIG. 2 is illustrated as a distinct component of the e-commerce platform 205, this is only an example. An engine could also or instead be provided by another component residing within or external to the e-commerce platform 205. In some implementations, one or more applications that are associated with the e-commerce platform 205 may provide an engine that implements the functionality described herein to make it available to customers and/or to merchants. Furthermore, in some implementations, the commerce management engine 236 may provide that engine. However, the location of the AR engine 210 may be implementation specific. In some implementations, the AR engine 210 may be provided at least in part by an e-commerce platform, either as a core function of the e-commerce platform or as an application or service supported by or communicating with the e-commerce platform. Alternatively, the AR engine 210 may be implemented as a stand-alone service to clients such as a customer device or a merchant device. In addition, at least a portion of such an engine could be implemented in the merchant system and/or in the customer device. For example, a customer device could store and run an engine locally as a software application.

The AR engine 210 is configured to implement at least some of the functionality described herein. Although the embodiments described below may be implemented in association with an e-commerce platform, such as (but not limited to) the e-commerce platform 205, the embodiments described below are not limited to e-commerce platforms.

The data facility 234 may store data collected by the e-commerce platform 205 based on the interaction of merchants and customers with the e-commerce platform 205. For example, merchants provide data through their online sales activity. Examples of merchant data for a merchant include, without limitation, merchant identifying information, product data for products offered for sale, online store settings, geographical regions of sales activity, historical sales data, and inventory locations. Customer data, or data which is based on the interaction of customers and prospective purchasers with the e-commerce platform 205, may also be collected and stored in the data facility 234. Such customer data is obtained on the basis of inputs received via customer devices associated with the customers and/or prospective purchasers. By way of example, historical transaction events data including details of purchase transaction events by customers on the e-commerce platform 205 may be recorded and such transaction events data may be considered customer data. Such transaction events data may indicate product identifiers, date/time of purchase, final sale price, purchaser information (including geographical region of customer), and payment method details, among others. Other data vis-à-vis the use of e-commerce platform 205 by merchants and customers (or prospective purchasers) may be collected and stored in the data facility 234.

The data facility 234 may include customer preference data for customers of the e-commerce platform 205. For example, the data facility 234 may store account information, order history, browsing history, and the like, for each customer having an account associated with the e-commerce platform 205. The data facility 234 may additionally store, for a plurality of e-commerce accounts, wish list data and cart content data for one or more virtual shopping carts.

Figure 3:
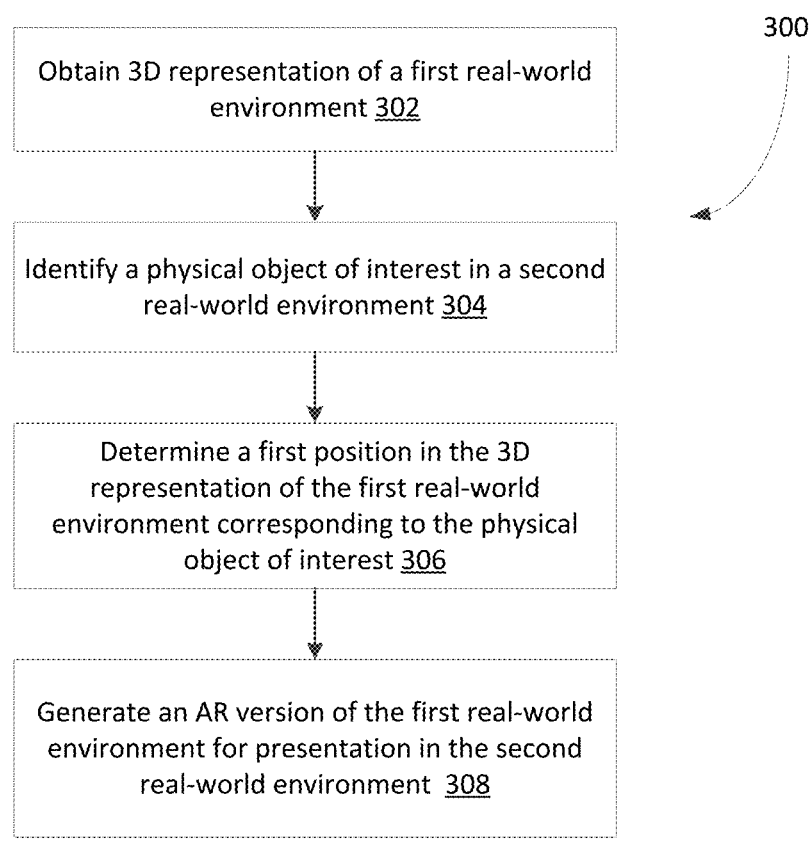
FIG. 3 shows, in flowchart form, an example method for generating an AR scene depicting real-world objects in a virtual environment.

Reference is now made to FIG. 3, which shows, in flowchart form, an example method 300 for generating an AR scene depicting real-world objects in a virtual environment. The method 300 may be performed by a computing system that supports generation of AR content, such as the AR engine 210 of FIG. 1. As detailed above, an AR engine may be a service that is provided within or external to an e-commerce platform. An AR engine may implement the operations of method 300 when processing requests for modeling physical, real-world objects in AR.

AR-enabled computing devices may be used to visualize a real-world space, including various physical objects that occupy the space. Such devices may additionally allow users to view altered representations of the real-world space. In some instances, users may desire to view physical objects from one real-world space (e.g., a brick-and-mortar store) represented in a view of another real-world space (e.g., a customer's own living room). In accordance with disclosed embodiments of the present disclosure, an AR engine can construct an AR scene of a target real-world space that includes a representation of a physical object of interest from a real-world object space. Users in the real-world object space can physically interact with the object of interest while viewing the object of interest within a virtual representation of the target real-world space in the AR scene.

Various real-world spaces may be suitable as target environments. In some implementations, a target real-world space may be an interior space within a structure (e.g., a building), such as a room, hallway, corridor, stairs, a landing, and the like. In particular, the target real-world space may be defined by a plurality of interior surfaces, including one or more walls, a floor, and a ceiling.

An AR engine obtains information describing the physical details of a target real-world space. Specifically, the AR engine obtains a three-dimensional representation of a first real-world environment, in operation 302. The 3D representation comprises data describing the shape and appearance of the first real-world environment. In particular, the 3D representation may identify, among others, space-defining features (e.g., windows, doors, etc.) of the first real-world environment and one or more physical objects that are contained in the first real-world environment. For example, the 3D representation may comprise a 3D model comprising textured meshes and/or point clouds.

In some implementations, the AR engine may obtain 3D scan data associated with a 3D scan of the first real-world environment. The 3D scan data may include at least one of camera data or scanner data (e.g., long-range laser scanner, LiDAR scanner, etc.). The camera data may include image or video data obtained using one or more camera sensors. For example, the camera data may be obtained via a camera associated with a user's computing device, such as a smartphone or tablet computer. The 3D scan data may be obtained during a manual 3D scan performed by a user. The manual scan may be performed so as to capture all or a significant portion of the physical information associated with the first real-world environment. In some implementations, the user may be prompted to provide 3D scan data, such as camera and/or laser scanner data, on their computing device. For example, a message may be provided, via a graphical user interface of an AR application, prompting the user to capture images and/or video depicting physical surroundings of the first real-world environment.

The 3D scan data provides geometric and/or texture information associated with the first real-world environment. The geometric data may include, for example, outline contour information. That is, contours of space-defining features and objects may be determined based on the 3D scan data. In some implementations, the AR engine may leverage an application or service to construct a geometric model of the real-world environment using the 3D scan data. The AR engine may provide the 3D scan data as input to a third-party application, service, or API framework (e.g., RoomPlan API) designed to create 3D floor plans of interior spaces. A geometric model, or a 3D floor plan, of the scanned space may be output. The geometric model may indicate key characteristics of the first real-world environment such as space-defining features, types of physical objects (e.g., furniture), and the like.

In some implementations, the 3D scan data may include surface texture data for the first real-world environment. Surface texture indicates the nature of an interpreted surface—a portion of a real-world surface—and may be described using specialized terms, such as lay, waviness, surface roughness, and color. In particular, surface texture comprises the small, local deviations of a surface from the perfectly flat ideal. For purposes of the present application, the term "surface texture" is used to broadly refer to data describing characteristics and appearance of a solid object's surface(s).

The AR engine may obtain the 3D representation of the first real-world environment by retrieving the representation, such as a 3D model, from a database storing 3D data associated with various real-world environments. Additionally, or alternatively, the 3D representation may be determined based on sensor data from user devices, such as customer devices 220 of FIG. 1, that are configured to capture 3D scan data. A user may perform a manual scan of the first real-world environment using their computing device, and the captured sensor data, such as camera and/or LiDAR sensor data, associated with the scan may be transmitted to the AR engine. The sensor data may be transmitted in real-time during a manual scan, or it may be stored locally and transmitted upon request from the AR engine for 3D data associated with the first real-world environment.

A physical, real-world object of interest from a second real-world environment may be desired to be viewed within a target real-world space. In particular, it may be desired to visualize the appearance and arrangements of a physical object of interest in a view of a first real-world environment without having to relocate the object from the second real-world environment. For example, a customer standing in a brick-and-mortar furniture store may wish to preview the appearance and arrangements of a sofa from the store in a view of their own living room, prior to purchasing and/or moving the sofa.

The AR engine identifies a physical object of interest in the second real-world environment, in operation 304. Specifically, the AR engine processes image data (e.g., images, videos, live media feeds, etc.) depicting the second real-world environment to identify a physical object of interest. In some implementations, the image data may comprise live video captured using a camera associated with an AR-enabled computing device, such as a smartphone or an HMD. The live video is video that is captured in real-time in the second real-world environment and which features the physical object of interest. For example, the live video may depict the physical object of interest and its immediate surroundings, such as nearby objects and/or surfaces. The AR engine may process video frames of the live video and perform object detection based on the video frames in order to identify one or more candidate physical objects that are featured in the scenes depicted in the video.

In at least some implementations, the physical object of interest may be selected by a user. For example, a customer at a furniture store may capture live video of a particular product at the store, such as a sofa. The video may be captured using software that supports AR content generation. The customer may input, via a user interface associated with the software, selection of a particular product that is featured in the video. For example, the customer may select, using an input interface or device, one of a plurality of candidate physical objects in the video. The selected physical object represents an object of interest for viewing in a target real-world space, i.e., the first real-world environment.

In some implementations, the AR engine may automatically determine the physical object of interest based on user interactions with objects of the second real-world environment. The AR engine may determine, based on sensor data of sensors associated with a user device or the second real-world environment, that the user is interacting with a specific physical object. For example, the AR engine may obtain hand- and eye-tracking data for a user in the second real-world environment and determine, based on the tracking data, that the user is primarily or exclusively interacting with one object. Such object may be determined, by the AR engine, to be the physical object of interest for the user.

In operation 306, the AR engine determines a position in the 3D representation of the first real-world environment corresponding to the physical object of interest. In particular, the AR engine determines a location ("target location") within the 3D representation of the first real-world environment for associating with the physical object of interest. An AR scene of the first real-world environment may then be generated so as to represent the physical object of interest at the target location. Additionally, or alternatively, the AR engine may determine an orientation of the physical object of interest with respect to the 3D representation of the first real-world environment. The determination of the position and/or orientation associated with the physical object of interest effectively determines how the first real-world environment will be represented in 3D relative to a view of the physical object of interest. For example, where the first real-world environment is a room (or another indoor space), the position and/or orientation associated with the physical object of interest determines how the room will be laid out in AR relative to the physical object of interest.

The position and/or orientation associated with the physical object of interest may be determined based on various rules and/or rule-based heuristics relating to the first real-world environment, the physical object of interest, and/or the user experiencing the AR. As will be described in greater detail with reference to FIG. 4, the position and/or orientation of the physical object of interest may be determined based on factors such as type of physical object, size and layout of the first real-world environment, and presence of related objects in the first real-world environment.

The AR engine generates an AR version of the first real-world environment, in operation 308. The AR version, i.e., an AR scene depicting the first real-world environment, is for presenting to users in the second real-world environment. In particular, the AR scene is viewable by users while they are physically present in the real-world environment that contains the physical object of interest. For example, an AR version of a customer's living room may be viewed by the customer using an AR-enabled computing device, such as an HMD, while the customer is interacting with a physical product (e.g., furniture, appliances, etc.) in a brick-and-mortar retail store. The AR version is generated using the 3D representation of the first real-world environment and based on positioning the physical object of interest in the first position in the AR version.

In some implementations, the AR version of the first real-world environment may be generated responsive to detecting certain triggers. That is, the AR engine may generate the AR scene of the target real-world environment in response to determining that at least one defined trigger condition is satisfied. The trigger conditions for generating the AR version may relate to, among others, status, action, and/or physical state of a user in the second real-world environment that interacts with the object of interest. The AR engine may be configured for accessing sensor data of various sensors in the second real-world environment, and the defined trigger conditions may be detected based on the sensor data. Examples of such sensors include, without limitation, on-board sensors associated with AR-enabled computing devices such as smartphones or HMDs (e.g., cameras, depth sensor, accelerometer, gyroscope, magnetometer, etc.), microphones, and cameras in the second real-world environment that are used for body (e.g., hand- and eye-) tracking.

A trigger condition may relate, for example, to a detected pose of a user relative to the physical object of interest in the second real-world environment. A pose of the user may be determined, for example, using sensors of an AR-enabled computing device worn by a user. The detected pose may indicate the nature of the user's interaction with the physical object of interest. By way of example, if a user is determined to be seated or moving toward sitting on a sofa based on accessible sensor data, the AR engine may generate the AR version of the target real-world environment. Other trigger conditions may relate to, for example, a distance of the user relative to the physical object of interest, or contact between the user and the object of interest. Additionally, input of the user received via an input interface may serve as a trigger condition for generating an AR version of the target real-world environment. For example, a user may expressly request, using an input interface for an AR-enabled computing device, to view the physical object of interest within the first real-world environment in AR.

The AR version of the first real-world environment is generated through a compositing process. In at least some implementations, the AR version may be generated based on combining a virtual 3D representation, such as a 3D model, of the first real-world environment with image data depicting the physical object of interest in the second real-world environment. The image data may, for example, comprise video data of a live video that, at least partially, depicts the second real-world environment, including the physical object of interest. The live video may be captured in real-time using cameras of an AR-enabled computing device, such as a smartphone or an HMD. For example, one or more cameras of an HMD worn by a user may be configured to capture video depicting a physical object of interest in the second real-world environment, and the video data (e.g., video frames) of the captured video may be combined with a 3D model of the first real-world environment in generating the AR scene.

The AR engine is configured to process image data to segment the physical object of interest from a scene of the second real-world environment. In particular, the AR engine may recognize the physical object of interest in an image (e.g., a 3D image, a video frame, etc.) and partition the image into subregions, i.e., an image subregion that contains the physical object of interest and an image subregion that does not contain the physical object of interest. In at least some implementations, the AR engine may employ edge detection techniques for recognizing boundaries associated with the physical object of interest in the image. The AR engine may, in some instances, perform feathering on the results of edge detection to, for example, soften jagged edges.

The subregion of the image that does not contain the real-world object is "masked" by the AR engine. Specifically, the 3D representation of the first real-world environment may be combined with the image of the physical object of interest such that the resulting AR version of the first real-world environment effectively hides the subregion not containing the real-world object of interest. In this way, only the physical object of interest is displayed for view in a composite scene, i.e., AR version of the first real-world environment. The composite scene may be editable—for example, additional virtual elements (e.g., virtual objects such as exercise equipment) may be introduced to the AR scene by the AR engine.

Figure 6:
FIG. 6 shows a scene of a real-world environment that includes a physical object of interest, as viewed on a computing device.
Figure 7:
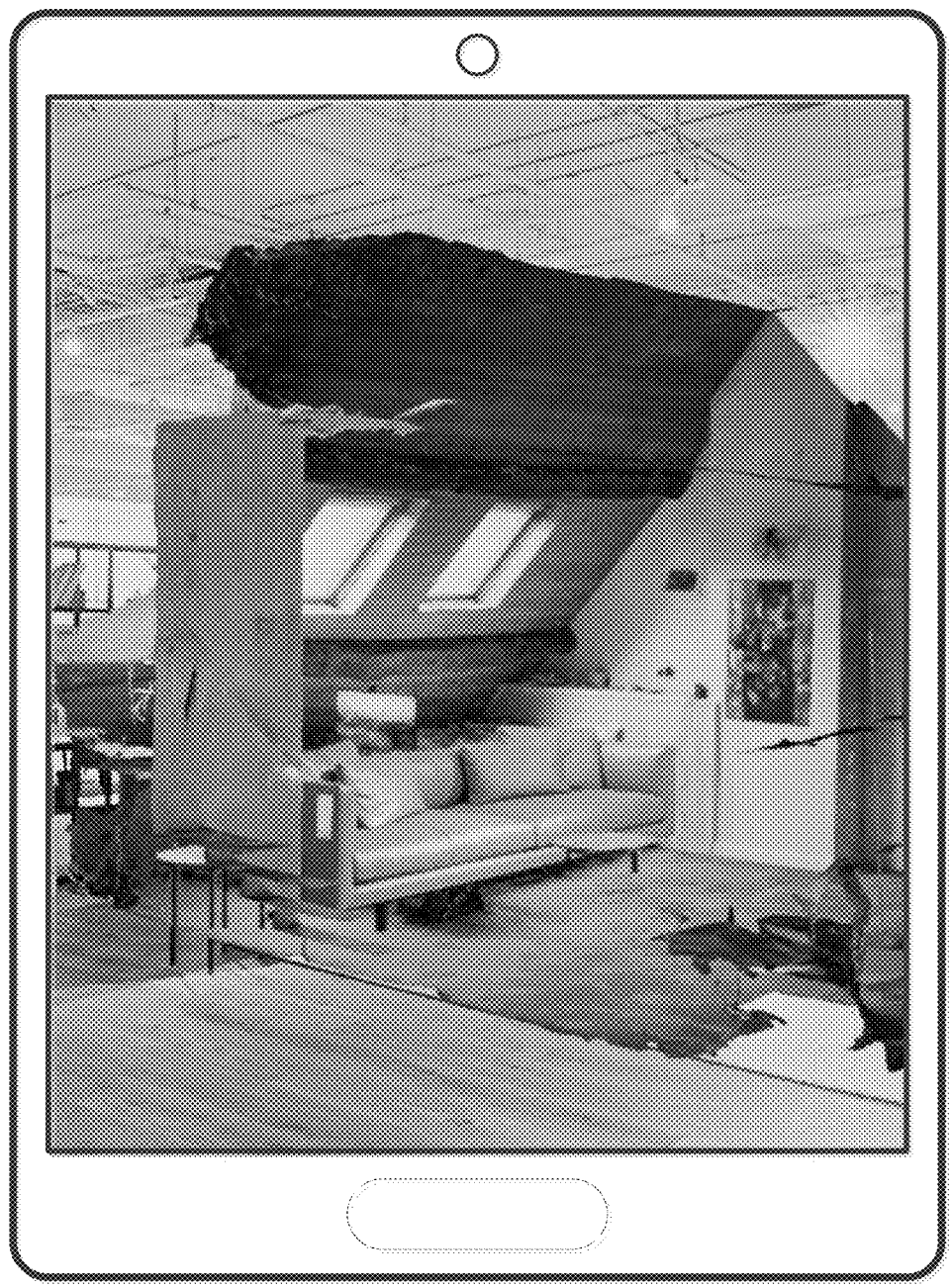
FIG. 7 shows a partial AR scene depicting a physical object of interest in a virtual environment, as viewed on an AR-enabled device.
Figure 8:
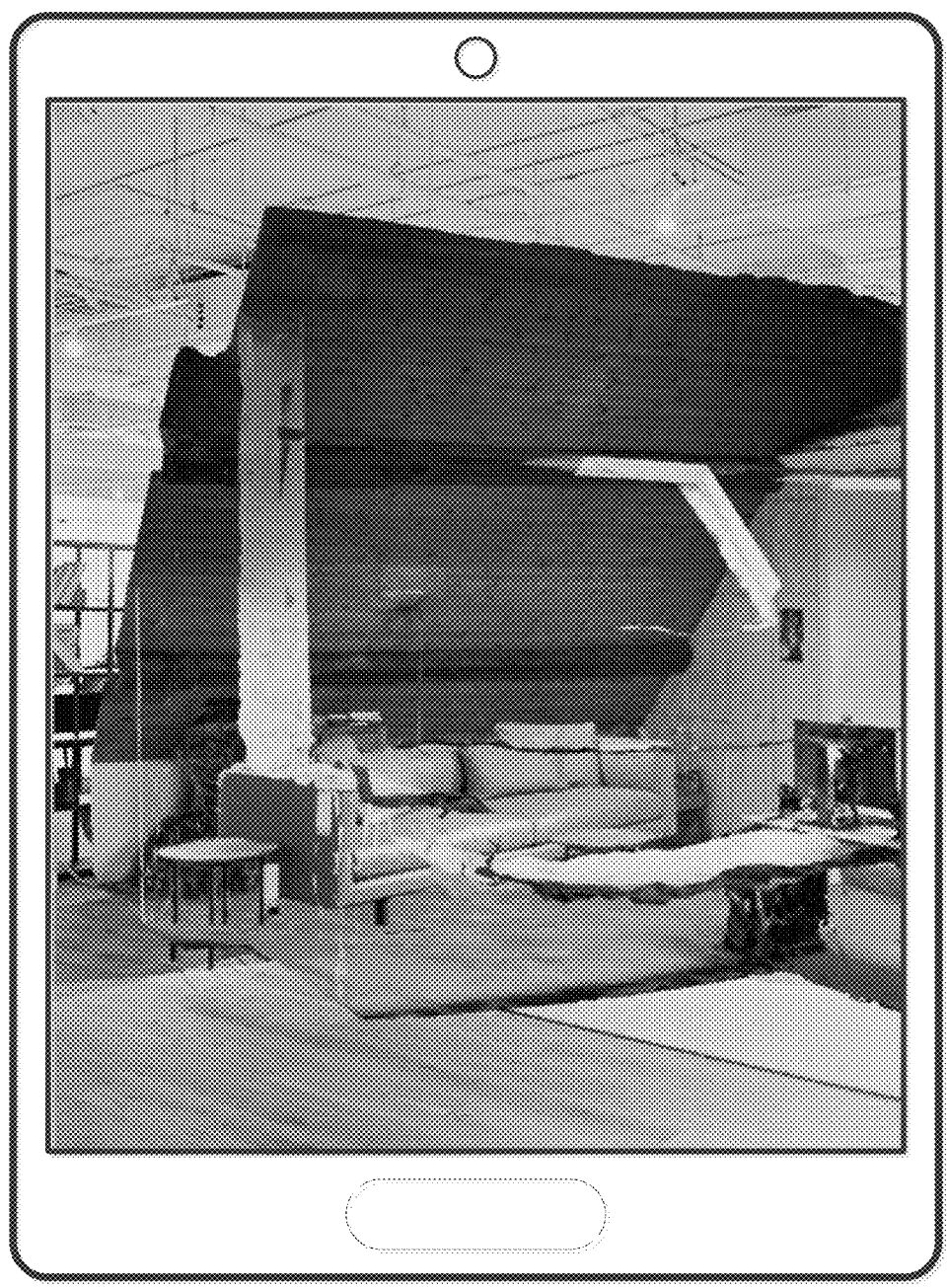
FIG. 8 shows another partial AR scene depicting a physical object of interest in a virtual environment, as viewed on an AR-enabled device.

FIG. 6 shows, displayed on a screen of a computing device, a physical object of interest, namely a couch, in its real-world surroundings (e.g., a furniture store). As shown in FIGS. 7 and 8, different AR scenes of a target real-world space, such as a user's own living room, that depict the physical object of interest may be generated and displayed on the screen of the computing device. In particular, by varying, at least, a location and/or orientation of the physical object of interest relative to the 3D representation of the target real-world space, different AR scenes featuring the physical object of interest may be visualized in AR.

Figure 4:
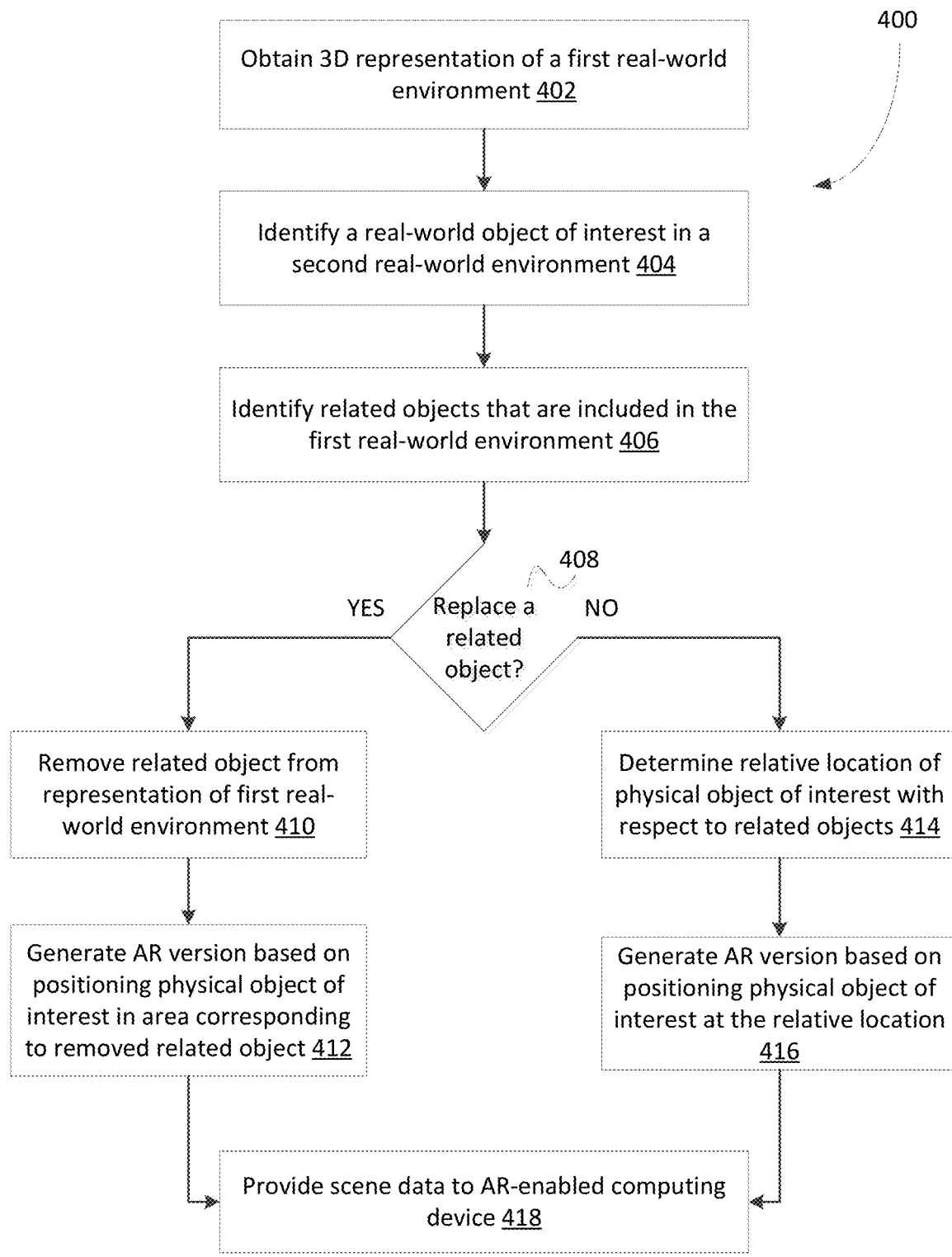
FIG. 4 shows, in flowchart form, another example method for generating an AR scene depicting real-world objects in a virtual environment.

Reference is now made to FIG. 4, which shows, in flowchart form, another example method 400 for generating an AR scene depicting real-world objects in a virtual environment. The method 400 may be performed by a computing system that supports generation of AR content, such as the AR engine 210 of FIG. 1. An AR engine may implement the operations of method 300 when processing requests for modeling physical, real-world objects in AR. The operations of method 400 may be performed in addition to, or as alternatives of, one or more operations of method 300.

In accordance with disclosed implementations, an AR engine can facilitate visualization of a physical object of interest from one real-world space in a view of a different ("target") real-world space. In particular, an AR scene of a target real-world environment that depicts a physical, real-world object of interest may be provided. An AR engine obtains a 3D representation of a first real-world environment, i.e., a target real-world space, in operation 402. The 3D representation may, for example, comprise a 3D model of the first real-world environment. The AR engine may obtain 3D scan data including at least one of a camera or a scanner (e.g., a long-run laser scanner, LiDAR scanner, etc.) and determine the 3D representation based on the scan data. Additionally, or alternatively, the AR engine may retrieve a stored 3D representation of the first real-world environment from a data store containing 3D data associated with various real-world environments. In operation 404, the AR engine identifies a physical object of interest in a second real-world environment. The physical object of interest may be manually selected by a user, or it may be automatically determined based on the user's interactions with the second real-world environment. Operations 402 and 404 may be performed in a similar manner as operations 302 and 304 of method 300, respectively.

In operation 406, the AR engine identifies one or more related objects in the first real-world environment. Specifically, objects of the target real-world environment that are related to the physical object of interest from the second real-world environment are identified. In at least some implementations, the 3D representation of the first real-world environment includes object information of objects that are determined to be in the first real-world environment. For example, a 3D model of the first real-world environment may include geometric information describing, at least, location, shape, boundary, and/or orientation of each of a plurality of objects in the first real-world environment. The object information of the related objects is used by the AR engine for determining how to position the physical object of interest in the AR scene. In some implementations, the 3D representation may include bounding box references associated with three-dimensional "bounding boxes" encompassing positions of the objects in the first real-world environment. The bounding box references may, for example, comprise geometric coordinates of boundaries of the boxes.

In some implementations, an object from the first real-world environment that is similar to the physical object of interest may be identified. A similar object may, for example, be an object that is of the same type as the physical object of interest. For example, if the physical object of interest is an armchair, a similar object may be a sofa, rocking chair, chaise lounge, and the like. As another example, if the physical object of interest is an LCD television, a similar object may be an OLED television, a projector screen, and the like. The similarity of objects may be determined based on comparison of object types as indicated, for example, in object data of objects stored with the 3D representation of the first real-world environment. The comparison may yield, in some implementations, a similarity score for an object pair.

The 3D representation of the first real-world environment and image data depicting the physical object of interest are combined via a compositing process. In some implementations, the 3D representation may be modified using information associated with one or more related objects that are identified in operation 406, and the modified 3D representation may be combined with the image data of the physical object of interest. For example, if the AR engine determines, based on the 3D representation, that a similar object is contained in the first real-world environment, the AR engine determines whether to replace the similar object in the 3D representation (operation 408). A similar object may be replaced, for example, in response to determining that a similarity score for the pair (i.e., physical object of interest and the similar object) exceeds a defined threshold value. If the AR engine determines that the similar object is to be replaced, the AR engine "removes" the similar object from the 3D representation of the first real-world environment, in operation 410. In particular, a modified 3D representation may be obtained by deleting object data associated with the similar object and by indicating a location previously associated with the similar object in the 3D representation of the first real-world environment as now unoccupied. The AR engine may then generate an AR version of the first real-world environment based on "positioning" the physical object of interest at the position of the similar object so as to replace the similar object in the 3D representation, in operation 412. That is, the modified 3D representation of the first real-world environment may be combined with image data of the physical object of interest such that the physical object of interest is associated with the location previously occupied by the similar object.

In a similar manner, the scale and/or orientation of the physical object of interest may be determined based on scale/orientation data for the similar object that is removed from the 3D representation of the first real-world environment. For example, the AR engine may associate the physical object of interest with the same orientation as the removed similar object in the 3D representation.

If, on the other hand, no similar objects are detected in the first real-world environment, the AR engine proceeds to operation 414. The AR engine determines the relative location of the physical object of interest with respect to one or more related objects from the first real-world environment.

In some implementations, the related objects may include complementary objects, such as décor and/or furniture, for the physical object of interest. For example, sofas and televisions may be complementary objects, as sofas (and similar types of chairs) are typically positioned across from and oriented to face toward a television set in a room. More generally, the AR engine may determine, based on, at least, geometric information of the first real-world environment, geometric information of the physical object of interest, and object relationships of objects in the first real-world environment, a relative location of the physical object of interest with respect to other objects from the first real-world environment. The relative location may be specified, for example, as a range of possible locations within the 3D representation of the first real-world environment (e.g., from which a possible location is selected). The range of locations may be indicated in ranges of real-world coordinates, i.e., coordinate system, for the first real-world environment.

In some implementations, the AR engine may identify an empty space in the 3D representation of the first real-world environment that is suitable for associating with the physical object of interest. For example, the empty space may be a space that is sized to fit the physical object of interest (e.g., taking into account the extent of objects already recognized in the first real-world environment) and that is within a range of possible locations of the physical object of interest relative to other objects in the first real-world environment.

In operation 416, the AR engine generates an AR scene, i.e., AR version of the first real-world environment, based on associating the determined relative location with the physical object of interest. The scene data for the generated AR scene is then provided to a suitable AR-enabled computing device, in operation 418. For example, the AR scene may be presented on a smartphone, HMD, etc. of a user that is physically present in the second real-world environment, allowing the user to visualize the physical object of interest at a specific location and orientation in a view of the first real-world environment.

Figure 5:
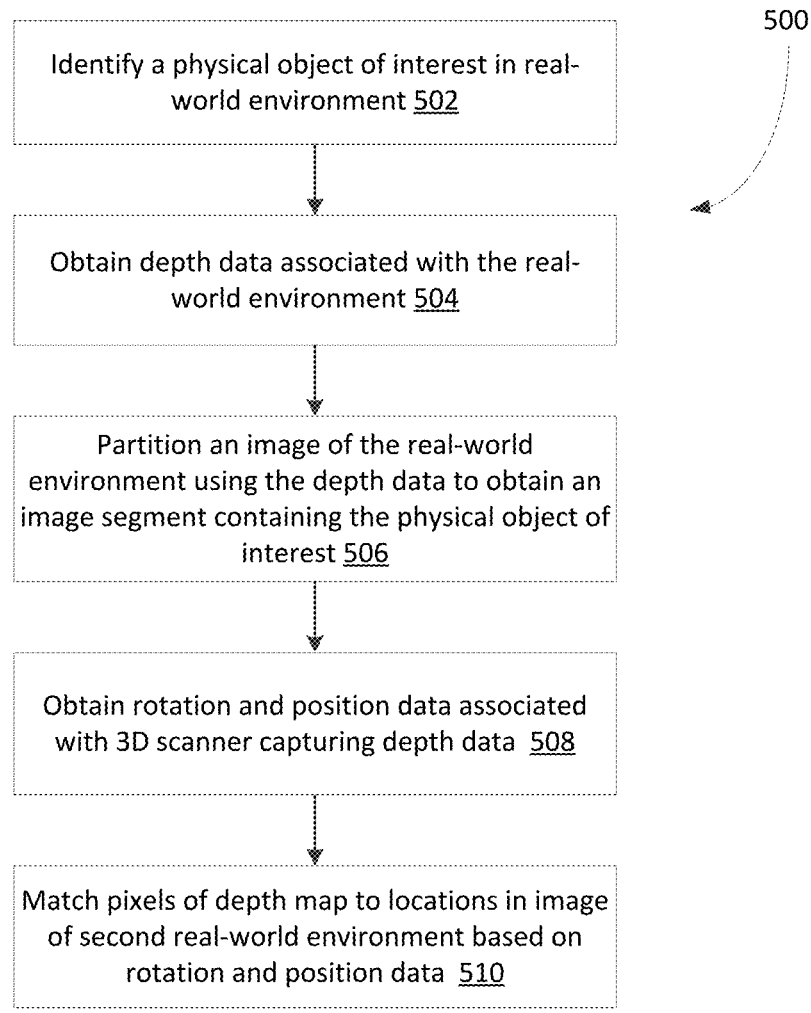
FIG. 5 shows, in flowchart form, an example method for performing object segmentation in images of a real-world object.

Reference is now made to FIG. 5, which shows, in flowchart form, an example method 500 for performing object segmentation in images of a real-world environment. The method 500 may be performed by a computing system that supports generation of AR content, such as the AR engine 210 of FIG. 1. In particular, the operations of method 500 may be performed as part of a process for identifying and segmenting an object of interest from an image, such as a live camera feed, of its real-world surroundings. In some implementations, the method 500 may be implemented as a sub-method of operation 304 of method 300. The operations of method 500 may be performed in addition to, or as alternatives of, one or more of the operations of methods 300 and 400.

The depth data or depth information associated with a real-world environment may be used as part of segmentation of objects from scenes of the real-world environment. An AR engine identifies a physical object of interest in a real-world environment, in operation 502. For example, the AR engine may process image data (e.g., images, videos, live media feeds, etc.) depicting, at least partially, the real-world environment, and identify a physical object of interest based on the image data. The physical object of interest may be expressly selected by a user or automatically determined by the AR engine.

In operation 504, the AR engine obtains depth data associated with the real-world environment. The depth data may be captured, for example, using optical sensors (e.g., a 3D scanner, such as a LiDAR scanner) or otherwise determined by, for example, interpolating it from data comprising stereo images obtained from camera(s) capturing images/video of the real-world environment. For example, a depth map or a depth buffer of the real-world environment may be generated by capturing the scene featuring the physical object of interest using a LiDAR scanner. The depth map or buffer for the scene may inform the isolating of the physical object of interest in an image of its surroundings.

The AR engine partitions an image of the real-world environment using the depth data to obtain an image segment containing the physical object of interest, in operation 506. In some embodiments, the AR engine may be configured to determine a bounding box around the physical object of interest, and to use the subset of depth data corresponding to that bounding box to determine which pixels to keep, i.e., to represent the segmented object. In particular, the bounding box may be used to constrain the depth data to real-world space. Pixels outside the real-world space bounding box can be deleted, and the depth data effectively serves as a mask for selecting the pixels of the image to keep.

In operation 508, the AR engine obtains rotation and position data associated with a 3D scanner capturing the depth data. Determining the subset of depth data that corresponds to the bounding box may include a step of mapping the depth data into a coordinate system of a real-world environment or a representation thereof. For example, the depth data may be combined with the rotation and position data from a camera/scanner to determine where a certain pixel in the depth map/buffer lies in the real-world space.

The AR engine matches pixels of the depth map/buffer to locations in image of the real-world environment based on rotation and position data, in operation 510. That is, a value for the pixel can be determined in real-world space. Advantageously, the use of depth map/buffer may avoid or reduce reliance on meshing or machine learning-based techniques for object segmentation—such techniques are generally CPU intensive and require training image recognition ML models. The depth data may be supplemented by geometric awareness of the scene (e.g., location of floor, ceiling, and walls) during object segmentation. In some implementations, the AR engine may truncate the bounding box to improve the object segmentation results. For example, where the bounding box comprises flat faces and the object of interest is situated on top of an uneven real-world surface (e.g., a shag carpet), the AR engine may raise the bottom face of the bounding box slightly to entirely or substantially exclude the uneven surface from the bounding box.

Figure 9A:
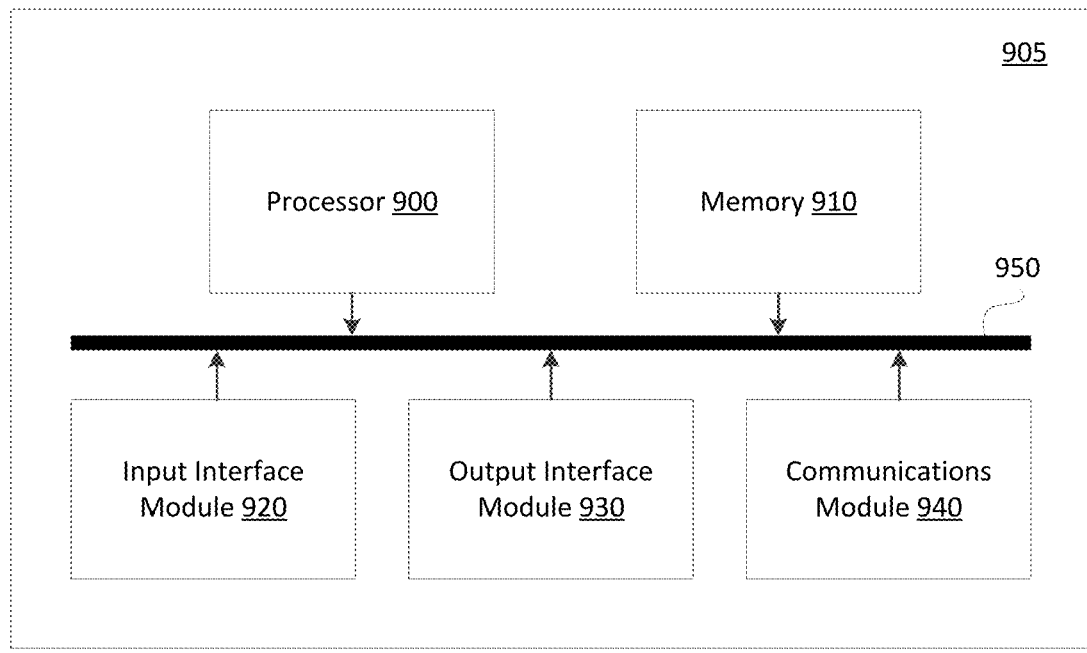
FIG. 9A is a high-level schematic diagram of an example computing device.

The above-described methods may be implemented by way of a suitably programmed computing device. FIG. 9A is a high-level operation diagram of an example computing device 905. The example computing device 905 includes a variety of modules. For example, as illustrated, the example computing device 905, may include a processor 900, a memory 910, an input interface module 920, an output interface module 930, and a communications module 940. As illustrated, the foregoing example modules of the example computing device 905 are in communication over a bus 950.

The processor 900 is a hardware processor. The processor 900 may, for example, be one or more ARM, Intel x86, PowerPC processors or the like.

The memory 910 allows data to be stored and retrieved. The memory 910 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 905.

The input interface module 920 allows the example computing device 905 to receive input signals. Input signals may, for example, correspond to input received from a user. The input interface module 920 may serve to interconnect the example computing device 905 with one or more input devices. Input signals may be received from input devices by the input interface module 920. Input devices may, for example, include one or more of a touchscreen input, keyboard, trackball or the like. In some implementations, all or a portion of the input interface module 920 may be integrated with an input device. For example, the input interface module 920 may be integrated with one of the aforementioned examples of input devices.

The output interface module 930 allows the example computing device 905 to provide output signals. Some output signals may, for example, allow provision of output to a user. The output interface module 930 may serve to interconnect the example computing device 905 with one or more output devices. Output signals may be sent to output devices by output interface module 930. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some implementations, all or a portion of the output interface module 930 may be integrated with an output device. For example, the output interface module 930 may be integrated with one of the aforementioned example output devices.

The communications module 940 allows the example computing device 905 to communicate with other electronic devices and/or various communications networks. For example, the communications module 940 may allow the example computing device 905 to send or receive communications signals. Communications signals may be sent or received according to one or more protocols or according to one or more standards. For example, the communications module 940 may allow the example computing device 905 to communicate via a cellular data network, such as for example, according to one or more standards such as, for example, Global System for Mobile Communications (GSM), Code Division Multiple Access (CDMA), Evolution Data Optimized (ENDO), Long-term Evolution (LTE) or the like. Additionally, or alternatively, the communications module 940 may allow the example computing device 905 to communicate using near-field communication (NFC), via Wi-Fi™, using Bluetooth™ or via some combination of one or more networks or protocols. Contactless payments may be made using NFC. In some implementations, all or a portion of the communications module 940 may be integrated into a component of the example computing device 905. For example, the communications module may be integrated into a communications chipset.

Software comprising instructions is executed by the processor 900 from a computer-readable medium. For example, software may be loaded into random-access memory from persistent storage of memory 910. Additionally, or alternatively, instructions may be executed by the processor 900 directly from read-only memory of memory 910.

Figure 9B:
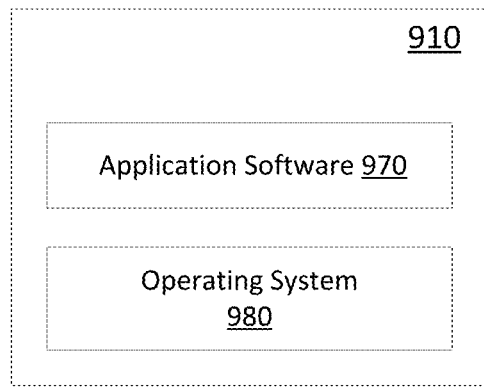
FIG. 9B shows a simplified organization of software components stored in a memory of the computing device of FIG. 9A.

FIG. 9B depicts a simplified organization of software components stored in memory 910 of the example computing device 105. As illustrated these software components include an operating system 980 and application software 970.

The operating system 980 is software. The operating system 980 allows the application software 970 to access the processor 900, the memory 910, the input interface module 920, the output interface module 930, and the communications module 940. The operating system 980 may be, for example, Apple™ OS X, Android™, Microsoft™ Windows™, a Linux distribution, or the like.

The application software 970 adapts the example computing device 905, in combination with the operating system 980, to operate as a device performing particular functions.

Example E-Commerce Platform

Although not required, in some implementations, the methods disclosed herein may be performed on or in association with an e-commerce platform. An example of an e-commerce platform will now be described.

Figure 10:
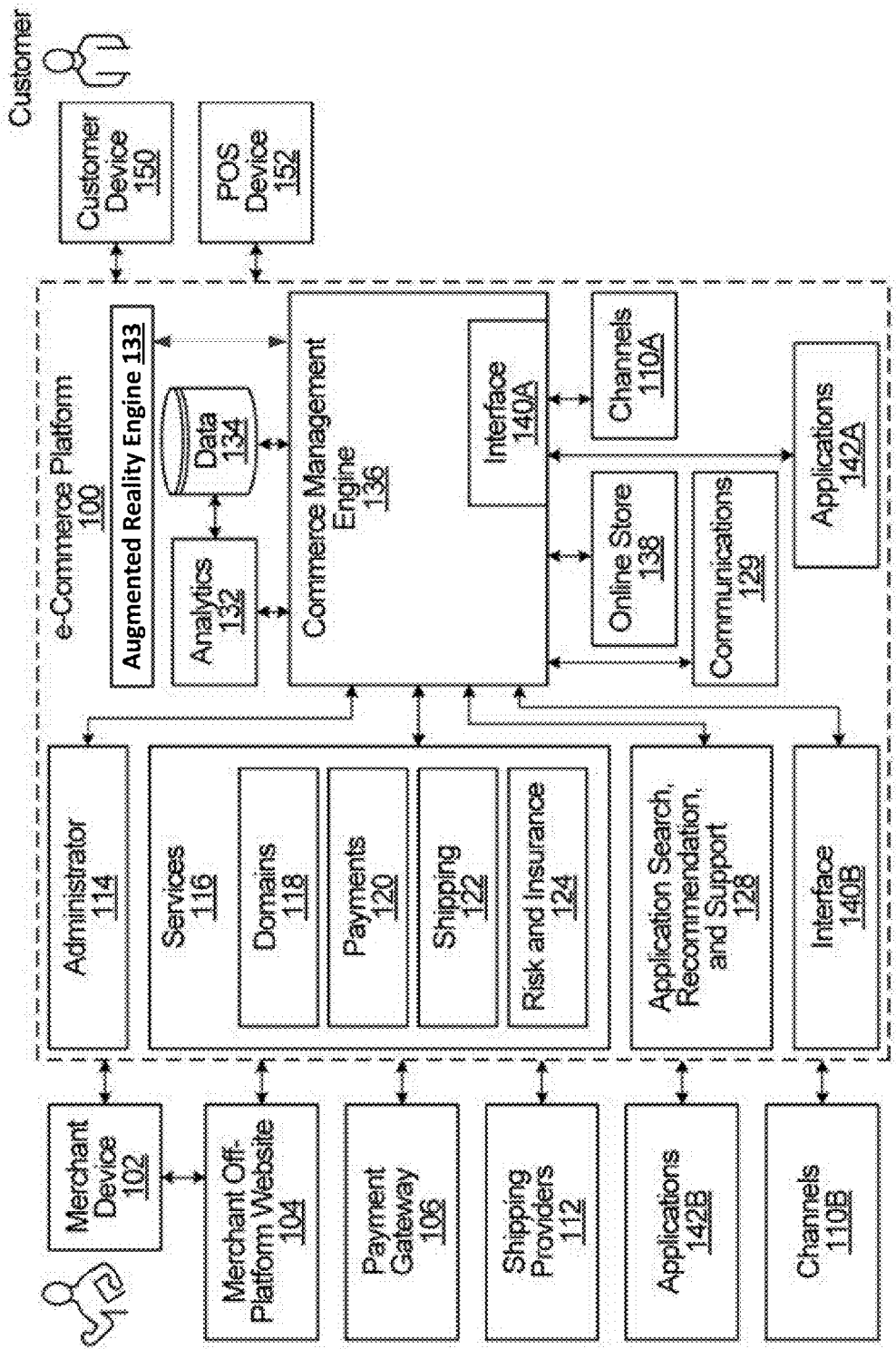
FIG. 10 is a block diagram of an e-commerce platform, in accordance with an example embodiment.

FIG. 10 illustrates an example e-commerce platform 100, according to one embodiment. The e-commerce platform 100 may be exemplary of the e-commerce platform 205 described with reference to FIG. 2. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some implementations, additionally or alternatively, be provided by one or more providers/entities.

In the example of FIG. 10, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some implementations, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some implementations, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some implementations, elements of the e-commerce platform 100 may be implemented to operate and/or integrate with various other platforms and operating systems.

In some implementations, the facilities of the e-commerce platform 100 (e.g., the online store 138) may serve content to a customer device 150 (using analytics 132 and/or data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some implementations, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally, or alternatively, it may be that themes can, additionally or alternatively, be customized using theme—specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some implementations, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some implementations, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 11:
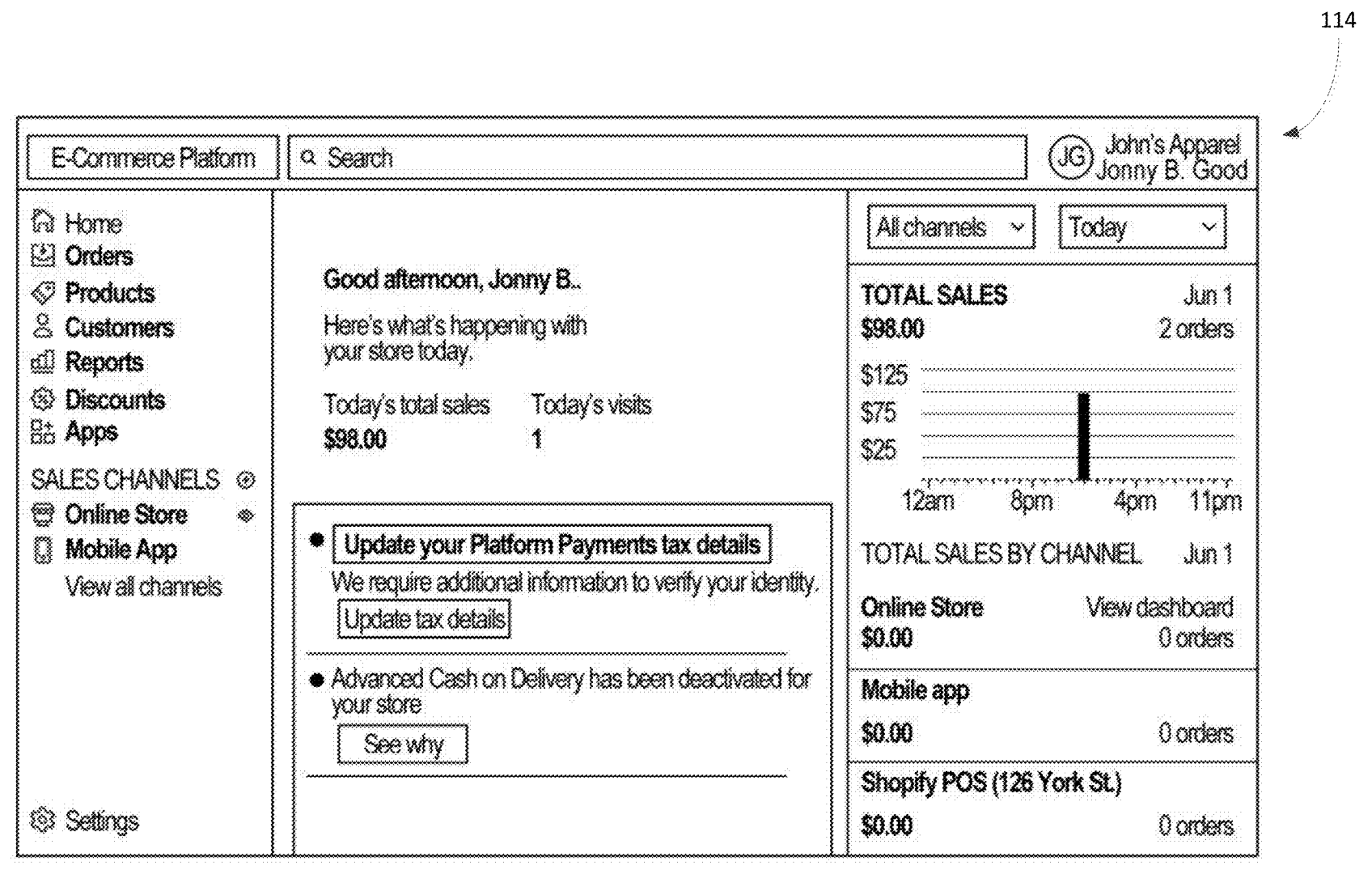

FIG. 11 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some implementations, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some implementations, the merchant may be able to access the different sections of the administrator 114 by using a sidebar, such as the one shown on FIG. 11. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some implementations, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some implementations, the e-commerce platform 100 may store this data in a data facility 134. Referring again to FIG. 10, in some implementations the e-commerce platform 100 may include a commerce management engine 136 such as may be configured to perform various workflows for task automation or content management related to products, inventory, customers, orders, suppliers, reports, financials, risk and fraud, and the like. In some implementations, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some implementations, may incorporate the administrator 114 and/or the online store 138.

The e-commerce platform 100 may implement an augmented reality engine 133 which may be configured to support at least some of the functions of the AR engine 210 of FIG. 2 described above. Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some implementations, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some implementations, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some implementations, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some implementations, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some implementations, update events may be queued and processed asynchronously from a state change that triggered them, which may produce an update event notification that is not distributed in real-time or near-real time.

In some implementations, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some implementations, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some implementations, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some implementations, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some implementations, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some implementations, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some implementations, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method, comprising:
obtaining a three-dimensional (3D) representation of a first real-world environment;
identifying a real-world object of interest in a second real-world environment, the first real-world environment different from the second real-world environment;
determining a first position in the 3D representation of the first real-world environment corresponding to the real-world object of interest based on determining a position of a similar real-world object in the first real-world environment; and
generating an augmented reality (AR) version of the first real-world environment for presentation in the second real-world environment using the 3D representation of the first real-world environment and based on positioning the real-world object of interest at the position of the similar real-world object in the AR version of the first real-world environment so as to replace the similar real-world object.

2. The method of claim 1, wherein generating the AR version of the first real-world environment comprises removing the similar real-world object from the 3D representation of the first real-world environment.

3. The method of claim 1, wherein generating the AR version of the first real-world environment comprises:
determining, based on the 3D representation, that the first real-world environment does not contain a similar real-world object; and
in response, positioning the real-world object of interest within an empty space that is sized to fit the real-world object of interest in the AR version of the first real-world environment.

4. The method of claim 3, wherein determining the first position in the 3D representation of the first real-world environment comprises determining positions of one or more objects in the 3D representation of the first real-world environment.

5. The method of claim 4, wherein determining the first position in the 3D representation of the first real-world environment comprises determining a position of a second object in the 3D representation of the first real-world environment, the second object satisfying a defined condition with respect to the real-world object of interest.

6. The method of claim 1, wherein the 3D representation of the first real-world environment comprises metadata indicating at least one of location or boundary associated with at least one object in the 3D representation.

7. The method of claim 1, further comprising obtaining a first image of the real-world object of interest and wherein generating the AR version of the first real-world environment comprises combining the first image and the 3D representation of the first real-world environment.

8. The method of claim 1, wherein the AR version of the first real-world environment is generated responsive to determining that a defined trigger condition is satisfied.

9. The method of claim 8, wherein the defined trigger condition relates to at least one of:
a detected pose of a user relative to the real-world object of interest;
input of the user received via an input interface;
a distance of the user relative to the real-world object of interest; or
detected contact between the user and the real-world object of interest.

10. The method of claim 1, wherein obtaining the 3D representation of the first real-world environment comprises obtaining 3D scan data including at least one of camera data or LiDAR sensor data.

11. The method of claim 1, wherein generating the AR version of the first real-world environment comprises identifying a first subregion of a first image containing the real-world object of interest and a second subregion of the first image that does not contain the real-world object of interest.

12. The method of claim 11, wherein generating the AR version of the first real-world environment comprises combining the 3D representation of the first real-world environment with the first image such that the second subregion of the first image is hidden in the AR version of the first real-world environment.

13. The method of claim 1, further comprising:
obtaining depth data associated with the second real-world environment; and
partitioning an image of the second real-world environment using the depth data to obtain an image segment containing the real-world object,
wherein generating the AR version of the first real-world environment comprises combining the image segment with the 3D representation of the first real-world environment.

14. The method of claim 13, wherein the depth data comprises a depth map of the second real-world environment generated using a 3D scanner.

15. The method of claim 14, further comprising:
obtaining rotation and position data associated with the 3D scanner capturing the depth map; and
matching pixels of the depth map to locations in the image of the second real-world environment based on the rotation and position data.

16. The method of claim 14, further comprising determining a bounding box representing a spatial extent of the real-world object in the second real-world environment, wherein the bounding box is determined based on the depth data.

17. A computing system, comprising:
a processor; and
a memory coupled to the processor, the memory storing processor-executable instructions that, when executed, are to cause the processor to:
obtain a three-dimensional (3D) representation of a first real-world environment;
identify a real-world object of interest in a second real-world environment, the first real-world environment different from the second real-world environment;
determine a first position in the 3D representation of the first real-world environment corresponding to the real-world object of interest based on determining a position of a similar real-world object in the first real-world environment; and
generate an augmented reality (AR) version of the first real-world environment for presentation in the second real-world environment using the 3D representation of the first real-world environment and based on positioning the real-world object of interest at the position of the similar real-world object in the AR version of the first real-world environment so as to replace the similar real-world object.

18. The computing system of claim 17, wherein the instructions, when executed, are to further cause the processor to:

obtain depth data associated with the second real-world environment; and partition an image of the second real-world environment using the depth data to obtain an image segment containing the real-world object, wherein generating the AR version of the first real-world environment comprises combining the image segment with the 3D representation of the first real-world environment.

19. The computing system of claim 17, wherein generating the AR version of the first real-world environment comprises:

determining, based on the 3D representation, that the first real-world environment does not contain a similar real-world object; and in response, positioning the real-world object of interest within an empty space that is sized to fit the real-world object of interest in the AR version of the first real-world environment.

20. A non-transitory processor-readable medium storing processor-executable instructions that, when executed by a processor, are to cause the processor to:

obtain a three-dimensional (3D) representation of a first real-world environment;

identify a real-world object of interest in a second real-world environment, the first real-world environment different from the second real-world environment;

determine a first position in the 3D representation of the first real-world environment corresponding to the real-world object of interest based on determining a position of a similar real-world object in the first real-world environment; and generate an augmented reality (AR) version of the first real-world environment for presentation in the second real-world environment using the 3D representation of the first real-world environment and based on positioning the real-world object of interest at the position of the similar real-world object in the AR version of the first real-world environment so as to replace the similar real-world object.

* * * * *